(No Model.)
J. W. REAMS.
HARVESTER.
No. 310,316. Patented Jan. 6, 1885.
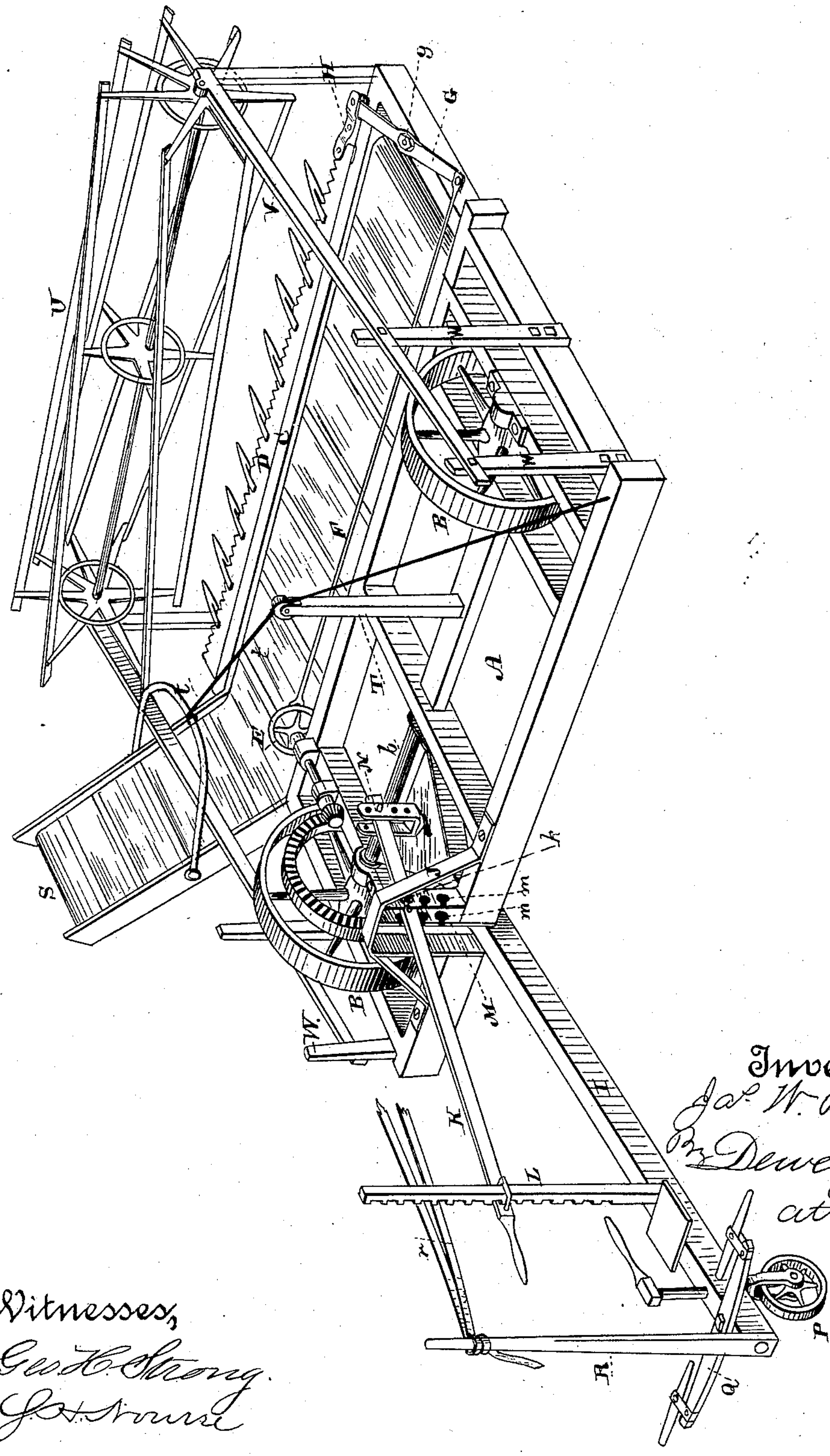
Witnesses,
Geo. H. Strong
J. H. Nourse
Inventor,
Jas. W. Reams
By Dewey & Co.
attorneys
N. PETERS, Photo-Lithographer, Washington, D. C.

UNITED STATES PATENT OFFICE.

JAMES W. REAMS, OF NAPA COUNTY, CALIFORNIA.

HARVESTER.

SPECIFICATION forming part of Letters Patent No. 310,316, dated January 6, 1885.

Application filed November 17, 1883. (No model.)

*To all whom it may concern:*

Be it known that I, JAMES W. REAMS, of the county of Napa and State of California, have invented an Improvement in Harvesters; and I do hereby declare the following to be a full, clear, and exact description thereof.

My invention relates to that class of harvesters known as "headers," and to certain new and useful improvements therein.

These improvements have for their object the lightening of labor of both man and beast, by reason of the best means for effectively operating the machine with the least exercise of power.

They consist, generally, of various mechanisms and arrangements of parts, having in view the operation of the cutter or knife and the handling of the machine, and will be more particularly described herein after referring to the accompanying drawing.

The figure represents a header embodying my improvements.

A is the frame of the machine, mounted or pivoted upon wheels B. C is the front beam, and D is the reciprocating cutter or knife, which derives its motion through suitable gearing from one of the wheels. Ordinarily this is accomplished by a crank-wheel, E, (here shown as geared to a wheel in a manner common and well known,) and a pitman, F, the outer end of which is joined to a long arm usually pivoted at the rear of the frame, and connected with the cutter at its forward end. In this arm the power is between the fulcrum and weight, and I propose to substitute for the form of lever one in which the fulcrum is between the power and weight. The lever G is pivoted at or near its center *g*, and the pitman is connected with one end of it, while the knife is joined to its outer end. In this device, instead of having a dead pull, I gain the advantage of an equal leverage on each side of the fulcrum. Another feature in this connection is the link H, which connects the knife and lever G. It consists of a short bar having slotted or forked ends in which the lever and knife are pivoted, as shown. This is a simple and effective connection, and not liable to get out of order.

Usually in machines of this class the tongue I is provided at its forward end with a cross head or bar, from which the hinge-connection is usually made with the rear beam of the main frame. Instead of this I cut the rear beam and introduce the forward end of the tongue, carrying it forward and pivoting it on a line with the axis or center of the wheels. This may be done in any suitable manner, though I have here shown it as pivoted on the axle *b* of one of the wheels. The advantage of this connection is that I am enabled to push from the line or center of the wheels direct, instead of from the back of the frame, and the thrust is therefore made easier on the horses, and at the same time the frame itself is more readily handled through the main operating-lever, because its power is not opposed by the pushing force necessary to advance the machine, as both are exerted on the same line—namely, the center of pivotal action. For security I brace the severed beam of the frame by a raised bar, J.

K is the lever by the operation of which the frame is turned on its wheels to throw the knife to or from the ground. This lever usually extends to the forward part of the frame, where it is connected and fulcrumed on the rear portion, whereby the frame is borne down in front and raised behind its pivotal line, or vice versa.

My lever is connected with the tongue behind the pivotal line, and is fulcrumed on the rear beam of the frame, and, instead of operating on the frame alone, operates on both tongue and frame to separate or cause them to approach to accomplish the same result—namely, inclining the frame. This enables me to use a much shorter lever and operate it with greater ease. L is the notched locking-bar, with which it engages, as usual, to hold it in any desired position.

I have a further improvement in this connection. The fulcrum-support M on the rear beam of the frame consists of two parallel uprights or slotted standards, through which the lever plays. It is provided on its back edge with a series of notches, *m*, into any of which a cross fulcrum-pin, *k*, on the lever K fits. The bearing N, which connects the forward end of the lever with the tongue, is mounted loosely enough to permit a certain rocking movement forward or back, whereby the lever K may be moved forward or back to enable it to withdraw its fulcrum-pin from one set of notches in the fulcrum-support and to fit them in another. In this way the fulcrum-point may be adjusted vertically, and the result is a greater or less inclination of the frame, as the case may be, for by lowering the fulcrum-pin the frame may be tilted to a certain angle, which angle may be increased by raising the fulcrum-pin, as described. In this manner I obtain wider limits for a high or low cut, as I may desire. The rod, which lies upon the lever K and is adapted (though not shown here) to throw the running parts into or out of gear, will of course have to be jointed at its forward end to be used in connection with the lever I have shown.

The tongues in implements of this class are usually very long, and are supported at their end by a steering-wheel, P. It is obvious that the longer the tongue the farther removed from the main wheels will the steering-wheel be, and the greater the space in which the whole machine can be turned. The steering-wheel cannot usually be placed any nearer, as the double-tree is always at a point farther forward, and the horses must have room. To provide for this and get the steering-wheel closer in, I place the double-tree Q on the tongue at a point farther back than the steering-wheel, and thus accomplish the object desired. On the end of the tongue is secured a standard, R, around which the reins *r* are wound. As the driver stands on the tongue farther forward than this standard, the reins may pass under each arm and be always convenient for his handling, and still give him the use of his hands to operate the lever K.

The spout S, which has hitherto been supported from a standard or standards on the front edge, near one side of the frame, I support by means of a rope, *t*, passing over a standard, T, placed over or near the line of pivotal action, and likewise I support the reel U by carrying its frame V back to standards W, similarly situated, instead of on the front corners of the frame.

Having thus described my invention, what I claim as new, and desire to secure by Letters Patent, is—

1. In a harvester, the wheeled frame A and tongue I, pivoted thereto, as shown, in combination with the lever K, connected with the tongue in front by a rocking bearing and fulcrumed on the rear of the frame in a slotted frame, and means, as described, by which the fulcrum-pin of said lever may be vertically adjusted, substantially as herein described.

2. In a harvester, the wheeled frame A and tongue I, pivoted thereto, said tongue being hinged to the axle, as shown, in combination with the lever K, pivoted to the forward end of the tongue by a rocking bearing, N, and having a cross-pin, *k*, and the slotted fulcrum-support, M, having the series of notches *m*, with which the pin *k* engages, whereby the fulcrum-pin of said lever may be vertically adjusted, substantially as herein described.

In witness whereof I have hereunto set my hand.

JAMES W. REAMS.

Witnesses:
W. N. BOWEN,
E. C. RUST.